United States Patent [19]

Porter

[11] 4,214,053

[45] Jul. 22, 1980

[54] LATEX FOAM RUBBER

[75] Inventor: David Porter, Sarnia, Canada

[73] Assignee: Polysar International, S.A., Fribour, Switzerland

[21] Appl. No.: 7,509

[22] Filed: Jan. 29, 1979

[30] Foreign Application Priority Data

Dec. 18, 1978 [CA] Canada ................................. 318128

[51] Int. Cl.² .............................................. C08J 9/30
[52] U.S. Cl. ...................... 521/70; 260/4 R; 260/4 AR; 260/29.7 H; 260/29.7 UA; 260/723; 428/95; 428/96; 428/262; 428/310; 521/65; 521/71; 521/89; 521/91
[58] Field of Search ....................... 521/65, 67, 68, 69, 521/70, 71

[56] References Cited

U.S. PATENT DOCUMENTS 3,904,558  9/1975  Steadman et al. .................... 521/70

*Primary Examiner*—Morton Foelak
*Attorney, Agent, or Firm*—Stevens, Davis, Miller & Mosher

[57] ABSTRACT

The gel range of acid-acting delayed-action gelling agents, such as sodium silicofluoride, in latex spread foam compounds which are to be gelled by subjecting them to a preliminary heat treatment prior to drying is substantially broadened by including a water-soluble ammonium or amine sulfamate in the compound. At least 0.5 parts by weight of the sulfamate should be used per 100 parts by weight of dry solids in the starting uncompounded latex. It can be added to the latex at any time before or during the compounding step and it is preferably added with 0.5–1 part of a soap per part of sulfamate and also with sufficient ammonium hydroxide or other ammonia donor compound to maintain the pH of the compounded latex composition at 9.5 or higher.

10 Claims, No Drawings

LATEX FOAM RUBBER

BACKGROUND OF THE INVENTION

This invention relates to the gelation method of preparing latex foam rubbers. More particularly, it relates to gelations in which alkali metal fluo-complexes are used as the gelling agents. It is recognized in the industry that these are acid-acting delayed-action gelling agents.

It is known that foam rubber can be prepared from a latex of a rubbery polymer by compounding the latex with the required ingredients, foaming the compounded latex, spreading the foam over a supporting substrate and heating it to set the foam structure, remove the water and form a dry vulcanized layer of foam rubber. See "Latex Foam Rubber" by E. W. Madge, John Wiley & Sons, New York and Maclaren & Sons Ltd., London, 1962, and British Pat. Nos. 598,610 (F. H. Untiedt), 1,342,510 (Firestone Tire and Rubber Co.) and 1,451,130 (Polysar Limited). The gelling agent, when used, is conventionally added just after the foaming step. It functions to destabilize the foamed latex compound and thus cause the rubber particles to join together in the form of a recticulate structure. Sodium silicofluoride (also called SSF) is the most commonly used fluo-complex-type of acid-acting delayed-action gelling agent although fluostannates, fluotitanates and fluozirconates of sodium and potassium have also been proposed. The important characteristic of these delayed-action gelling agents is that as a result of their time-dependent chemical action, they cause progressive destabilization of the foamed latex compound which culminates in its gelation into the reticulate structure. This places a limit on the time within which the foamed compound must be used and places a limit on the amount of gelling agent which can be used. In spread foam applications, e.g. providing fabrics such as carpets with attached layers of foam rubber using sodium silicofluoride as gelling agent, experience has shown that it is difficult to maintain operations at the optimum amount of gelling agent since the "gel range" is too restricted, especially with a highly loaded compound. "Gel range" may be defined as the spread in the amount of gelling agent which can be added to the latex compound and still obtain good foam products. The spread in the gel-range for highly loaded compounds to be gelled by sodium silicofluoride is about 0.1–0.2 part, e.g. at the 2.5 parts SSF level it would be about 2.4–2.6 parts by weight of SSF per 100 parts by weight of latex solids in the compound. This allows very little leeway for variation in the concentration of the sodium silicofluoride solution makeup and in the rate of addition of the sodium silicofluoride solution to the latex compound as it is being fed to the foaming apparatus. Unless the amount of sodium silicofluoride added is controlled very carefully to keep it within the gel-range for the existing foaming conditions, crazing, cracking or areas of collapse are encountered in the resulting foam rubber products. It is desirable to find a method for broadening the gel range for the acid-acting delayed-action gelling agents in general and sodium silicofluoride in particular to avoid these problems.

SUMMARY OF THE INVENTION

It has now been found that the gel-range of the acid-acting delayed-action gelling agents in foamed acid-coagulable latex compounds which are to be gelled by subjecting them to a preliminary heat-treatment prior to drying can be substantially broadened by including at least about 0.5 part by weight of a water-soluble ammonium or amine sulfamate in the latex compound. Satisfactory results can be obtained using 0.5–3 parts by weight of the sulfamate, but best results will be obtained using 0.5–2 parts, e.g. about 1 part by weight per 100 parts by weight of dry latex solids in the compound. The function of the sulfamate compound is not time-dependent. This is a distinct advantage over the use of time-dependent compounds such as ammonium acetate, since it can be added to the latex compound (free of any time-dependent gelling agent) and the compounded latex can be stored for a considerable period of time without fear of gelation taking place. With ammonium acetate, gelation takes place in too short a time and thus storage for any length of time is impossible.

DETAILED DESCRIPTION

The sulfamates useful in this invention are those which hydrolyze in water when the temperature is raised but which are characterized by little or no hydrolysis at ambient temperatures. The amine radical can be one derived from any amine which has a boiling point in the range of about $-35°$ C. to $+300°$ C. and preferably between about $-35°$ C. to $+175°$ C. Examples of the amines are the $C_1$–$C_3$ alkyl and alkylene amines and the $C_2$–$C_3$ alkanol amines, such as ethyl amine, monoethanolamine, diethanolamine, propyl amine, amyl amine, hexyl amine, monoisopropanolamine, diisopropanolamine, ethylene diamine, triethylene tetramine, morpholine, etc. Ammonium sulfamate, along with the $C_2$–$C_3$ alkanolamine sulfamates, are the preferred compounds with ammonium sulfamate being most preferred. The amount of sulfamate salt added will be preferably in the range of 0.5–3 parts by weight per 100 parts by weight of uncompounded latex solids and more preferably 0.5–2 parts, e.g. 1.0 part. The usual gel range spread of about 0.2 part for sodium silicofluoride normally encountered, e.g. 2.4–2.6 parts will be widened to about a spread of 4 more, e.g. to 1–5 or 2–7.

The latices to which the heat-gelling system of the present invention may be applied are those in which the rubbery polymer particles are stabilized, i.e. maintained in suspension by the absorbed ions of an emulsifying agent which forms water-insoluble compounds on reaction with acidic materials. These include natural rubber latex, synthetic rubber latices in which anionic water-soluble alkali metal, ammonium or amine salts based on rosin acids or $C_5$–$C_{20}$ saturated or unsaturated carboxylic acids, etc. form the major proportion of the emulsifier system and blends of these latices. Examples of these emulsifiers are sodium, potassium, ammonium and monomethyl-amine stearates, oleates, plamitates, laurates, abietates, sulfated and sulfonated derivatives of these acids, etc. and mixtures of such emulsifiers. The rubbery polymers may be homopolymers of $C_4$–$C_{10}$ conjugated dienes such as butadiene; 2-methyl butadiene; 2-chloro butadiene; pentadiene-1,3; 2,3-dimethyl pentadiene-1,3; 2,5-dimethyl hexadiene-1,5; cyclopentadiene and halo-substituted derivates of these compounds. The rubbery polymers may also be copolymers of the $C_4$–$C_{10}$ conjugated dienes with each other or with one or more copolymerizable monomers containing a $CH_2$=$C<$ group such as styrene, acrylonitrile, methacrylonitrile, acrylic acid, methacrylic acid, methyl methacrylate, ethyl acrylate, acrylamide, acrolein, alpha and beta methyl acroleins, maleic acid, fumaric acid, itaconic acid, cinnamic acid, cinnamaldehyde, vinyl chloride, vinylidene chloride, isobutylene, divinyl benzene and methy vinyl ketone. If desired, the rubbery polymer latices may be blended with minor proportions of acid-coagulable latices of hard, resinous polymers such as polystyrene, polyacrylonitrile, polyvinylidene chloride, polyvinyl chloride, polyvinyl acetate, polymethyl methacrylate, copolymers of the monomers of these resinous polymers and resinous copolymers of these monomers with other copolymerizable monomers such as the $C_4$-$C_{10}$ conjugated dienes. For best results, the starting latices should contain 40-75 weight % total solids before compounding.

The latex compositions may be used for the production of foam rubber-backed fabrics, particularly carpets, and for the manufacture of unattached foam rubber sheeting and molded foam articles. The materials and procedures heretofore used in the production of latex foam rubber articles are generally applicable to the novel latex compositions of the present invention. These materials include gelation sensitizers, gelling agents, foaming agents and thickeners to provide latex stability during compounding and foam stability until gelation takes place and also greater uniformity in the foam rubber structure, antioxidants for aging resistance, fillers, and vulcanization systems which include activators, accelerators and vulcanizing agents usually of the sulfur type.

In preparing the latex compositions, the starting latex is placed under good agitation at ambient temperature and the various components are added. Except for the gelling agent, which should be added last, it is not necessary that they be added in any particular order but it is good practice to add the foaming agent prior to the other components. It may be more convenient at times to add the various components in the form of aqueous solutions of dispersions except for the fillers which are normally added in the dry form. The sulfamate salt can be added as a solution in water, e.g. 50% solution, before, at the same time as or after the other components have been compounded into the latex. It is preferably added with sufficient ammonium hydroxide or other ammonia donor compound to maintain the pH of the latex composition at 9.5 or higher and preferably at a pH of at least 10.0. Part of the ammonia compound can be replaced with a less volatile $C_1$-$C_8$ saturated alkyl or alkanol amine such as ethyl, ethanol, propyl, isopropyl, propanol, isopropanol amine, 1,2-diaminoethane, etc. The sulfamate does not cause excessive viscosity increase in the latex on being added to it.

After compounding has been completed, the latex composition is ready for further processing into the finished foam rubber product. The latex composition is foamed to 2-20 times its volume, spread or shaped into the desired configuration and heated to effect gelation, drying and vulcanization. Known means and conditions are used for this purpose.

The following examples are provided to illustrate the invention in greater detail. Unless otherwise noted, all parts and percentages are on a dry weight basis and all formulations are based on 100 parts by weight of dry total solids in the uncompounded starting latex.

EXAMPLES 1-24

A potassium oleate-stabilized synthetic latex comprising about 90 weight % of particles of a rubbery copolymer of butadiene and styrene having a copolymerized styrene content of 23% and about 10 weight % of resinous polystyrene particles and containing a total solids content of about 65 weight % and a pH of 9.5 (designated as Latex A in the tabulated examples) was compounded and tested as indicated in Table I. In Examples 1-18, it was compounded by itself, while in Examples 19-24, it was compounded after blending with other preformed latices designated as Latex B and Latex C. Latex B was a latex of a carboxylated copolymer of butadiene and styrene having a copolymerized styrene content of 77 weight % and Latex C was a latex of a homopolystyrene. As expected, somewhat stiffer foam rubbers were produced with these latex blends due to the higher content of the harder polymers in Latices B and C.

The compounded latex compositions were foamed to various degrees as indicated by the cup weights, spread on a jute fabric (except that in Example 6 it was spread on the underside of a tufted carpet), exposed to 1 minute of heating under a bank of infra-red lamps to gel the foam and heated in a 150° C. hot air circulating oven to dry and cure the foam rubber.

In view of the excellent open time of Example 14, this compound was rerun 18 hours later at three different SSF levels (Examples 16, 17 and 18) to see how a time delay would affect the compound. Good foam rubbers were produced.

The ammonium sulfamate was added as a 50 weight percent solution in water which also contained 0.5 part of potassium oleate per part of the sulfamate.

As can be seen from the Table, the gel range of the sodium silicofluoride has been widened greatly at different foam densities and viscosities by the inclusion of the ammonium sulfamate in the latex compound. This allows for a broad processing latitude and thus permits the use of sodium silicofluoride where normally it would not be even considered.

TABLE I

| Example | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|
| Latex A | 100 | ↑ | ↑ | ↑ | ↑ | ↑ | ↑ | ↑ | 100 | ↑ | ↑ | ↑ | ↑ | ↑ | ↑ | ↑ | 100 | ↑ | 95 | ↑ | ↑ | 95 | ↑ | ↑ |
| Latex B | | | | | | | | | | | | | | | | | | | 5 | ↑ | ↑ | 5 | ↑ | ↑ |
| Latex C | | | | | | | | | | | | | | | | | | | | | | | | |
| Potassium oleate soap | 2.5 | ↑ | ↑ | ↑ | ↑ | ↑ | ↑ | ↑ | 2.5 | ↑ | ↑ | 2.36 | ↑ | ↑ | ↑ | ↑ | 2.5 | ↑ | ↑ | ↑ | ↑ | ↑ | ↑ | ↑ |
| Calcium carbonate filler | 50.0 | ↑ | ↑ | ↑ | ↑ | ↑ | ↑ | ↑ | 50 | ↑ | ↑ | ↑ | ↑ | ↑ | ↑ | ↑ | 50 | ↑ | ↑ | ↑ | ↑ | ↑ | ↑ | ↑ |
| Silicone surfactant | 0.15 | ↑ | ↑ | | | | | | | | | | | | | | | | | | | | | |
| Carboxymethylcellulose | | | 0.20 | | | | | | 0.20 | | | | | | | | 0.20 | | | | | | | |
| Hindered phenol anti-oxidant | 1.0 | ↑ | ↑ | ↑ | ↑ | ↑ | ↑ | ↑ | 1.0 | ↑ | ↑ | ↑ | ↑ | ↑ | ↑ | ↑ | 1.0 | ↑ | ↑ | ↑ | ↑ | ↑ | ↑ | ↑ |
| Zinc diethyldithiocarbamate | 1.5 | ↑ | ↑ | ↑ | ↑ | ↑ | ↑ | ↑ | 1.5 | ↑ | ↑ | ↑ | ↑ | ↑ | ↑ | ↑ | 1.5 | ↑ | ↑ | ↑ | ↑ | ↑ | ↑ | ↑ |
| Zinc mercaptobenzothiazole | 1.5 | ↑ | ↑ | ↑ | ↑ | ↑ | ↑ | ↑ | 1.5 | ↑ | ↑ | ↑ | ↑ | ↑ | ↑ | ↑ | 1.5 | ↑ | ↑ | ↑ | ↑ | ↑ | ↑ | ↑ |
| Zinc oxide | 3.0 | ↑ | ↑ | ↑ | ↑ | ↑ | ↑ | ↑ | 3.0 | ↑ | ↑ | ↑ | ↑ | ↑ | ↑ | ↑ | 3.0 | ↑ | ↑ | ↑ | ↑ | ↑ | ↑ | ↑ |
| Sulfur | 2.0 | ↑ | ↑ | ↑ | ↑ | ↑ | ↑ | ↑ | 2.0 | ↑ | ↑ | ↑ | ↑ | ↑ | ↑ | ↑ | 2.0 | ↑ | ↑ | ↑ | ↑ | ↑ | ↑ | ↑ |
| Sodium silicofluoride | 5.8 | 3.6 | 2.9 | 1.75 | 0.7 | 2.3 | 1.2 | 1.1 | 1.4 | 2.4 | 3.3 | 2.0 | 3.4 | 4.8 | 7.0 | 4.1 | 2.4 | 5.0 | 3.0 | 4.0 | 5.0 | 3.0 | 4.0 | 5.0 |
| Ammonium sulfamate | 1.05 | ↑ | ↑ | ↑ | ↑ | ↑ | ↑ | ↑ | 1.05 | ↑ | ↑ | ↑ | ↑ | ↑ | ↑ | ↑ | 1.05 | ↑ | ↑ | ↑ | ↑ | ↑ | ↑ | ↑ |
| Total solids | 71.8 | 70.2 | ↑ | ↑ | ↑ | 70.5 | ↑ | ↑ | 69.2 | ↑ | ↑ | 66.7 | ↑ | ↑ | ↑ | ↑ | 66.7 | ↑ | 66.1 | ↑ | ↑ | 67.4 | ↑ | ↑ |
| pH | 10.8 | 10.6 | ↑ | ↑ | ↑ | 10.8 | ↑ | ↑ | 10.3 | ↑ | ↑ | 10.8 | ↑ | ↑ | ↑ | ↑ | 10.8 | ↑ | 10.6 | ↑ | ↑ | 10.7 | ↑ | ↑ |
| Viscosity-CP-RTV #4 at 20 rpm | 6500 | 5780 | ↑ | ↑ | ↑ | 3800 | ↑ | ↑ | 3500 | ↑ | ↑ | 3850 | ↑ | ↑ | ↑ | ↑ | 3850 | ↑ | 3470 | ↑ | ↑ | 3750 | ↑ | ↑ |
| Cup weight-g/l | 315 | ↑ | ↑ | ↑ | ↑ | 280 | 250 | 225 | 320 | ↑ | ↑ | 350 | ↑ | ↑ | ↑ | 340 | 330 | ↑ | 350 | ↑ | ↑ | ↑ | ↑ | ↑ |
| Foam thickness-mm | 3.0 | 4.0 | ↑ | ↑ | ↑ | ↑ | ↑ | ↑ | 3.0 | ↑ | ↑ | ↑ | ↑ | ↑ | ↑ | ↑ | 3.0 | ↑ | ↑ | ↑ | ↑ | ↑ | ↑ | ↑ |
| Running speed-m/min. | 1.2 | 1.0 | ↑ | ↑ | ↑ | ↑ | ↑ | ↑ | 1.0 | ↑ | ↑ | ↑ | ↑ | ↑ | ↑ | ↑ | 1.0 | ↑ | ↑ | ↑ | ↑ | ↑ | ↑ | ↑ |
| Infra-red-kw/m² | 7.5 | 8.0 | ↑ | ↑ | ↑ | ↑ | ↑ | ↑ | 8.0 | ↑ | ↑ | ↑ | ↑ | ↑ | ↑ | ↑ | 8.0 | ↑ | ↑ | ↑ | ↑ | ↑ | ↑ | ↑ |
| Cure time at 150° C.-mins. | 10 | ↑ | >30 | ↑ | ↑ | ↑ | ↑ | ↑ | 10 | ↑ | ↑ | ↑ | ↑ | ↑ | ↑ | ↑ | 10 | ↑ | ↑ | ↑ | ↑ | ↑ | ↑ | ↑ |
| Open time*-min. | 28.2 | As for 1 | | | | | | | | | 27.8 | | | 38.6 | 9.5 | | 153 | 4.2 | | | | | | |
| Comments | Excellent crack-free surface and foam structure | As for 1 | As for 1 but a few pin holes on surface | As for 1 | As for 1 but a few pin holes on surface | As for 1 | As for 1 | As for 1 | As for 1 | As for 1 | As for 1 | Slightly under-gelled, some surface crazing, fair foam structure | Very slightly under-gelled, good surface and foam structure | As for 1 | As for 1 | As for 1 | As for 1 but slightly under-gelled | As for 1 but many small pin holes in surface | Excellent surface but with a few pin holes, fair foam structure | As for 1 | As for 1 but a few pin holes in surface | Excellent surface but with a few pin holes, fair foam structure | As for 1 but a few pin holes in surface | As for 1 but a few pin holes in surface |

*the length of time that the compound remains fluid and workable after the gelling agent is added

EXAMPLES 25-28

To check the effect of high filler loading samples of a potassium oleate stabilized latex comprising about 85 weight % of particles of a rubbery copolymer of butadiene and styrene having a copolymerized styrene content of 23%, and about 15 weight % of resinous polystyrene particles were compounded with 0.5 part of potassium oleate emulsifier, 1.0 part tall oil emulsifier, 125 parts of aluminum silicate filler, 1.0 part hindered phenol, 1.5 part zinc diethyldithiocarbamate, 1.0 part of zinc mercaptobenzothiazole, 3.0 parts of zinc oxide, 2.0 parts of wax, 2.0 parts of sulfur, 0.5 part of triethyl trimethylene triamine mixed with 0.2 part of potassium oleate, 0.3 part of ammonium hydroxide, 1.0 part of ammonium sulfamate mixed with 0.8 part of potassium oleate, sufficient water to provide a total solids content of 74 weight % and 0.25 part of sodium polyacrylate. The compounds were foamed to cup weights of about 300 g/l and then various amounts of sodium silicofluoride were mixed into the foamed compounds. Each of the foams was then spread to a thickness of about 6 mm on a jute fabric, exposed for 30 seconds under a bank of infra-red lamps at 8 kw/m$^2$ to gel the foam and then heated for 20 minutes in a hot air circulating oven held at 135° C. to dry and cure the resulting foam rubber product. Good foam rubbers were produced in each case indicating that a widened gel range was obtained with the sulfamate compound. The results are recorded in Table II.

TABLE II

| Example | 25 | 26 | 27 | 28 |
|---|---|---|---|---|
| Sodium silicofluoride | 1.5 | 2.0 | 2.5 | 3.0 |
| Ammonium sulfamate | 1.0 | 1.0 | 1.0 | 1.0 |
| pH | 11.2 | 11.2 | 11.2 | 11.2 |
| Viscosity-cP-RVT #3 at 12 rpm | 6000 | 6000 | 6000 | 6000 |
| Cup weight-g/l | 295 | 304 | 290 | 306 |
| Open time-minutes | 15.0 | 11.5 | 7.5 | 5.3 |
| Comments | Satisfactory surface and foam structure | As for 25 | Optimum surface and foam structure | As for 25 |

What is claimed is:

1. A method for broadening the gel range of alkali metal fluosilicate gelling agents, in foamed acid-coagulable rubber latex polymer compounds which are to be gelled by subjecting them to a preliminary heat treatment prior to drying, comprising including in the latex compound a water-soluble ammonium or amine sulfamate in an amount of at least 0.5 part by weight of sulfamate per 100 parts by weight of dry solids in the uncompounded latex, said sulfamate being one which hydrolyzes in water when the temperature is raised but which is characterized by little or no hydrolysis in water at ambient temperatures and being one in which the ammonium or amine radical is derived from an amine (including ammonia) which has a boiling point in the range of −35° C. to +300° C.

2. A method as claimed in claim 1 wherein if the pH of the latex compound as formed is not at least 9.5, the pH is adjusted to at least 9.5 with ammonium hydroxide or another ammonia donor or with a less volatile amine substituted for part of the ammonia compound.

3. A method according to claim 2 wherein the gelling agent is sodium silicofluoride.

4. A method according to claim 2 wherein the sulfamate is ammonium sulfamate and it is added in amount of 0.5-3 parts by weight per 100 parts by weight of dry solids in the uncompounded latex.

5. A method according to claim 2 wherein the preliminary heat treatment is carried out by subjecting the foam to infra-red radiation.

6. A method according to claim 2 wherein the latex comprises a major proportion of a rubbery copolymer of butadiene and styrene and a minor proportion of a hard resinous polymer.

7. A method wherein the sulfamate-containing latex compound prepared according to the method of claim 2 is foamed, the foam is spread as a layer over a supporting substrate, the spread foam is subjected to a preliminary heat treatment to gel it and then the gelled foam is subjected to a further heat treatment to dry and vulcanize it.

8. A method according to claim 7 wherein 0.5-3 parts of sulfamate are included in the latex compound, the compound is foamed and then spread as a layer over a supporting fabric substrate, the spread layer of foam is subjected to a preliminary heating by infra-red radiation to cause the foam to become gelled and subsequently subjected to further heating in a hot air circulating oven to dry and vulcanize it.

9. A foamable compounded acid-coagulable latex composition comprising a latex of a rubbery polymer, an alkali metal fluosilicate gelling agents and at least 0.5 part of a water-soluble ammonium or amine sulfamate, said part being by weight per 100 parts by weight of dry solids in the uncompounded starting latex, said sulfamate being one which hydrolyzes in water at elevated temperatures but which remains substantially unhydrolyzed in water at ambient temperatures and being one in which the ammonium or amine radical is derived from an amine (including ammonia) which has a boiling point in the range of −35° C. and +300° C.

10. A composition is claimed in claim 9 wherein the gelling agent is sodium silicofluoride, the sulfamate is ammonium sulfamate and the pH is at least 9.5.

* * * * *

UNITED STATES PATENT AND TRADEMARK OFFICE
CERTIFICATE OF CORRECTION

PATENT NO. : 4,214,053
DATED : July 22, 1980
INVENTOR(S) : David PORTER

It is certified that error appears in the above-identified patent and that said Letters Patent are hereby corrected as shown below:

Column 3, line 38, delete "of" and insert --or--.

Signed and Sealed this

Twenty-third Day of December 19.

[SEAL]

Attest:

SIDNEY A. DIAMOND

Attesting Officer

Commissioner of Patents and Trademu